UNITED STATES PATENT OFFICE.

FREDERICK C. ROCKWELL, OF WEST HARTFORD, CONNECTICUT, AND WILBUR M. DAVIS, OF GLOUCESTER, MASSACHUSETTS.

ART OF PRODUCING THEATRICAL EFFECTS.

1,295,374. Specification of Letters Patent. Patented Feb. 25, 1919.

No Drawing. Application filed December 17, 1917. Serial No. 207,531.

*To all whom it may concern:*

Be it known that we, FREDERICK C. ROCKWELL, a citizen of the United States, residing at West Hartford, in the county of Hartford and State of Connecticut, and WILBUR M. DAVIS, a citizen of the United States, residing at Gloucester, in the county of Essex and State of Massachusetts, have invented a new and useful Improvement in the Art of Producing Theatrical Effects, of which the following is a specification.

This invention relates to the art of producing theatrical effects by combining normal human action and animated pictures.

The object of the invention is to provide a simple method by means of which parts of a scene may be performed by live actors, and parts be depicted by motion pictures, the real and picture actions being so represented and synchronized that one will merge into or supplement the other and produce a harmonious and complete scene.

Acting has been combined with moving pictures, but it has been necessary for the live actors to take positions at one side of the screen in the shade out of the light rays thrown by the picture projecting machine so that part of the picture would not be thrown upon them and they would not obstruct or interfere with or block out a part of the picture and cast a shadow on the screen. Furthermore, realistic effect has not been possible owing to the fact that the pictures were not shown in natural colors and the change from the colors of the real to the black and white of the picture is too startling a contrast to be effective.

By the practice of our present method actors may appear in front of the screen and perform their several parts without having part of the picture thrown on them and without obscuring or interfering with any part of the animated features thrown on the screen, and the screen is so treated that the objects in the animated picture will appear in natural colors and thus the picture may be used to supplement the natural acting without the violent eye shock incident to passing from live characters in natural colors to pictures in black and white.

In carrying out this process the scene to be enacted and reproduced is first presented in front of an ordinary moving picture camera and the film developed and printed by the usual apparatus in the common way. When the film is printed an opaque substance, having the outlines of the objects to the height of and in the locations to be occupied by the living actors, is placed in the printing machine in such manner as to render blank such portions of the film. The film thus prepared is put into an ordinary picture projecting machine and thrown upon a fixed blank screen of the usual dimensions. When this picture is shown the sections which have been deleted will, of course, appear clear on the screen. These clear sections on the screen may then be painted by hand in full detail to show the fixed objects which have been cut out of the film, and openings may be made in the screen at desired localities in these sections for the passage through them of the live actors. After this has been done the mechanism of the projector may be started and the picture slowly thrown on the screen. While the scene is being thus slowly shown the various localities and paths on the screen in which the several objects to be pictured will appear are lightly outlined. After the scene has been sufficiently exposed to show on the screen the localities and paths of the various objects the base or ground colors or tones of the objects of the scene are applied to the screen in the localities and in the paths in which they will appear as the picture is projected and which have been roughly and lightly sketched thereon.

For a simple example, assume the scene to be one of an encampment consisting of tents pitched in the foreground on grass covered soil, a parade area in the middle, woods and mountains in the distance, blue sky and moving clouds overhead, and with a company of soldiers marching from the woods to the parade ground. In carrying out our process with a simple scene of this nature the front row of tents and the verdure, to the height of the natural actors, may be, as stated, cut out from the moving picture film so that these sections if the picture only were shown would be blank on the screen. The objects thus cut out are then painted by a scene painter in full detail and in natural colors on this blank space on the screen. Openings may be made in the screen, for instance, having outlines of the doors of the painted tents, and a short distance back of these openings fixed drops may be hung, which drops can be painted to represent the interior of the tents.

On the sections of the screen on which the animated picture is to be shown where the sky will appear the screen is tinted from the deep blue overhead to the light blue of the horizon; where the woods and mountains will appear the screen is tinted from the light green of the near woods to the darker green and blue of the far woods and hills; the locality where the pictured tents will appear contains white; green is applied where the grass and brush will appear; yellow where the road will be; the paths of the faces of the soldiers will be treated with flesh tints; the paths of the uniforms of the soldiers will be khaki colored and the paths of the other objects will be similarly treated in the natural base tints or ground colors of such objects. These colors are applied in transparent tints, each is put on before the other is dry. They, of course, overlap and they are carefully blended together so that nowhere is there a sharp line of demarcation between any of the colors. In fact, the portion of the screen thus prepared and upon which the animated picture will be projected, appears when hung in position for use to be covered with nothing but an incongruous daub of many colors without reason, design or artistic effect. However, if the natural color of the object is on the portion of the screen upon which the picture of the object is projected the exposure fixed on the film so effects the light rays passing through it that the object picks out or selects from the colors on the screen its own natural tint, killing or neutralizing any other colors that may be in the same locality, so that each object appears to the eye of the observer in life-like tones.

With the screen thus prepared and the picture thrown thereon in black and white the various objects of the picture will appear in their natural colors and the action of the live actors is so synchronized with the picture projected that at the desired moment to complete the scene the actors may step forth and perform their parts in front of the screen. For instance, assuming the picture to be as the example above described, an officer may be sitting in his tent back of the door opening and as the soldiers of the picture appear on the parade ground, or as they pass off he may step forth and do his part, and after he has completed his act, or while he is acting, the animated part of the scene may continue or resume action and complement or supplement the act. With the section of the picture taken up by the live actors removed from the film and fixed on the screen, no portion of the picture is thrown on the actors and the actors do not obstruct or interfere with any portion of the picture which is thrown on the screen.

The invention claimed is:

1. The art of producing composite dramatic and pictorial theatrical effects which consists in painting a portion of a fixed screen with representations of objects in full detail and enacting a physical scene in conjunction therewith, coloring the remainder of the screen in the localities and paths in which objects will appear with ground tones, blended together so there will be no line of demarcation between them of the objects to be shown thereon and projecting on the portions of the screen colored with said blended ground tones pictures of the objects having those tones.

2. The art of producing composite dramatic and pictorial theatrical effects which consists in painting in detail on portions of a screen fixed objects of the picture, painting the remainder of the screen with ground tones, blended together so there will be no line of demarcation between them of the objects to be pictured thereon, blanking out of the picture film those portions containing the objects that are painted in full detail on the screen, projecting the picture remaining on the film upon the screen and in conjunction therewith enacting a physical scene.

FREDERICK C. ROCKWELL.
WILBUR M. DAVIS.